(12) United States Patent
Khlat

(10) Patent No.: US 9,088,326 B2
(45) Date of Patent: Jul. 21, 2015

(54) FRONT END RADIO ARCHITECTURE HAVING A SPLIT BAND ARRANGEMENT WITH CO-BANDING

(71) Applicant: RF Micro Devices, Inc., Greensboro, NC (US)

(72) Inventor: Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 92 days.

(21) Appl. No.: 13/921,285

(22) Filed: Jun. 19, 2013

(65) Prior Publication Data

US 2014/0024329 A1    Jan. 23, 2014

Related U.S. Application Data

(60) Provisional application No. 61/673,008, filed on Jul. 18, 2012.

(51) Int. Cl.
*H04B 1/10* (2006.01)
(52) U.S. Cl.
CPC ........................... *H04B 1/10* (2013.01)
(58) Field of Classification Search
CPC .............. H04B 1/10; H04B 1/18; H04B 1/30; H04B 1/40; H04B 1/44; H04B 1/54
USPC ............. 455/76–78, 303, 307, 313, 323, 334, 455/550.1
See application file for complete search history.

(56) References Cited

U.S. PATENT DOCUMENTS

2006/0270370 A1* 11/2006 Bergman ................... 455/188.1
2013/0225070 A1* 8/2013 Lin ............................. 455/41.1

OTHER PUBLICATIONS

Author Unknown, "3rd Generation Partnership Project; Technical Specification Group Radio Access Network; Evolved Universal Terrestrial Radio Access (E-UTRA); User Equipment (UE) radio transmission and reception (Release 11)," Technical Specification 36.101, Version 11.1.0, Jun. 2012, 336 pages.

* cited by examiner

*Primary Examiner* — Nhan Le
(74) *Attorney, Agent, or Firm* — Withrow & Terranova, P.L.L.C.

(57) ABSTRACT

A front end radio architecture is configured to provide a split band frequency arrangement that includes co-banding. The disclosed split band frequency arrangement combines a medium bandwidth filter with a small bandwidth filter to provide enough bandwidth to pass a relatively large communication band. The medium bandwidth filter has a bandwidth that is large enough to support co-banding of smaller communication bands, while also having a narrow enough bandwidth to realize a relatively steep roll-off that ensures coexistence with adjacent bands that are not co-banded. The bandwidths of the medium bandwidth filter and the small bandwidth filter overlap in bandwidth by an amount that is at least as large as the highest bandwidth signal expected to be received or transmitted. The split band frequency arrangement reduces the number of filters needed in the front end radio architecture by repurposing the small bandwidth filter, and by co-banding the smaller communication bands.

20 Claims, 3 Drawing Sheets

FRONT END RADIO ARCHITECTURE HAVING A SPLIT BAND ARRANGEMENT WITH CO-BANDING

RELATED APPLICATIONS

This application claims the benefit of U.S. provisional patent application No. 61/673,008, filed Jul. 18, 2012, the disclosure of which is incorporated herein by reference in its entirety.

FIELD OF THE DISCLOSURE

The present disclosure relates to radio frequency (RF) filters used in RF communications circuitry.

BACKGROUND

A new radio front end architecture is needed to support a world phone or world tablet type user equipment that is required to operate in a carrier aggregation mode for many band combinations. For example, the radio of a world phone or world tablet is required to support band 7 (B7) of Long-Term Evolution Frequency Division Duplex (LTE FDD) along with bands B38, B40, B41, and B41 Extended Global Platform (XGP) LTE Time Division Duplex (TDD), which covers a bandwidth that ranges from 2300 MHz to 2700 MHz.

There are numerous LTE TDD bands within the bandwidth that ranges from 2300 MHz to 2700 MHz. As a result, a relatively large number of separate transmit filters and receive filters are needed. For example, the transmit filters are used to prevent spurious noise from being transmitted into receivers that are tuned to frequencies within an industrial, scientific, and medical (ISM) band. A world phone or world tablet user equipment will typically include several receivers for the ISM band. Typically, the receivers will be dedicated to wireless data technologies such as wireless fidelity (Wi-Fi) and Bluetooth.

The receive filters are typically used to protect against the ISM transmit signals inside the same user equipment. The ISM transmit signals can have power levels as high as +10 dBm. Moreover, the RX filters must protect against external blocker levels that exist due to base transmitter stations (BTS), television (TV) stations, etc.

In one particular example, bands B38 and B41 XGP require separate receive filters for a main reception while also requiring a separate transmit filter. Moreover, a diversity or receive multiple input multiple output (MIMO) path requires separate receive filters for each band that is allocated for diversity reception. As a result of this relatively large number of receive and transmit filters, along with an increased number of switch throws, an undesirable increase in insertion loss will occur. For example, each switch throw typically adds around 0.08 dB of insertion loss for the relatively high frequencies that range from 2300 MHz to 2700 MHz.

Thus, there is a need for a new radio front end architecture that is configured to rearrange LTE TDD band filtering such that the number of receive filters and transmit filters needed is reduced. Benefits of the new radio front end architecture include a reduced number of switch throws and reduced insertion loss.

SUMMARY

A front end radio architecture is configured to provide a split band frequency arrangement that includes co-banding. The disclosed split band frequency arrangement combines a medium bandwidth filter with a small bandwidth filter to provide enough bandwidth to pass a relatively large communication band. The medium bandwidth filter has a bandwidth that is large enough to support co-banding of smaller communication bands, while also having a narrow enough bandwidth to realize a relatively steep roll-off that ensures coexistence with adjacent bands that are not co-banded. The bandwidths of the medium bandwidth filter and the small bandwidth filter overlap in bandwidth by an amount that is at least as large as the highest bandwidth signal expected to be received or transmitted. The split band frequency arrangement reduces the number of filters needed in the front end radio architecture by repurposing the small bandwidth filter, and by co-banding the smaller communication bands.

One embodiment of the front end radio architecture splits a relatively large bandwidth of a receive band into a lower receive sub-band and an upper receive sub-band. A medium bandwidth receive filter is configured to receive signals within the lower receive sub-band. Co-banded signals within the lower receive sub-band are also receivable through the medium bandwidth receive filter. A receive diversity filter is repurposed via switches to receive signals within the upper receive sub-band. As a result of reusing the receive diversity filter, the total filter count needed by the front end architecture is reduced by at least one filter. The total filter count is also reduced by one filter for each small band that is included within the bandwidth of the medium bandwidth receive filter, since a separate filter would typically be needed for each of the relatively small bands filtered in a front end radio architecture that does not implement co-banding.

Another embodiment of the front end architecture splits a relatively large bandwidth of a transmit band into a lower transmit sub-band and an upper transmit sub-band. A medium bandwidth transmit filter is configured to pass transmit signals within the upper transmit sub-band. Co-banded signals within the upper transmit sub-band are also transmittable through the medium bandwidth transmit filter. A small bandwidth transmit filter is repurposed via switches to pass transmit signals within the lower transmit sub-band. As a result of reusing the small bandwidth transmit filter, the total filter count needed by the front end architecture is reduced by at least one filter. The total filter count is also reduced by one filter for each of the relatively small bands included within the bandwidth of the medium bandwidth transmit filter, since a separate filter would typically be needed for each of the relatively small bands filtered in a front end radio architecture that does not implement co-banding.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

Figure 1:
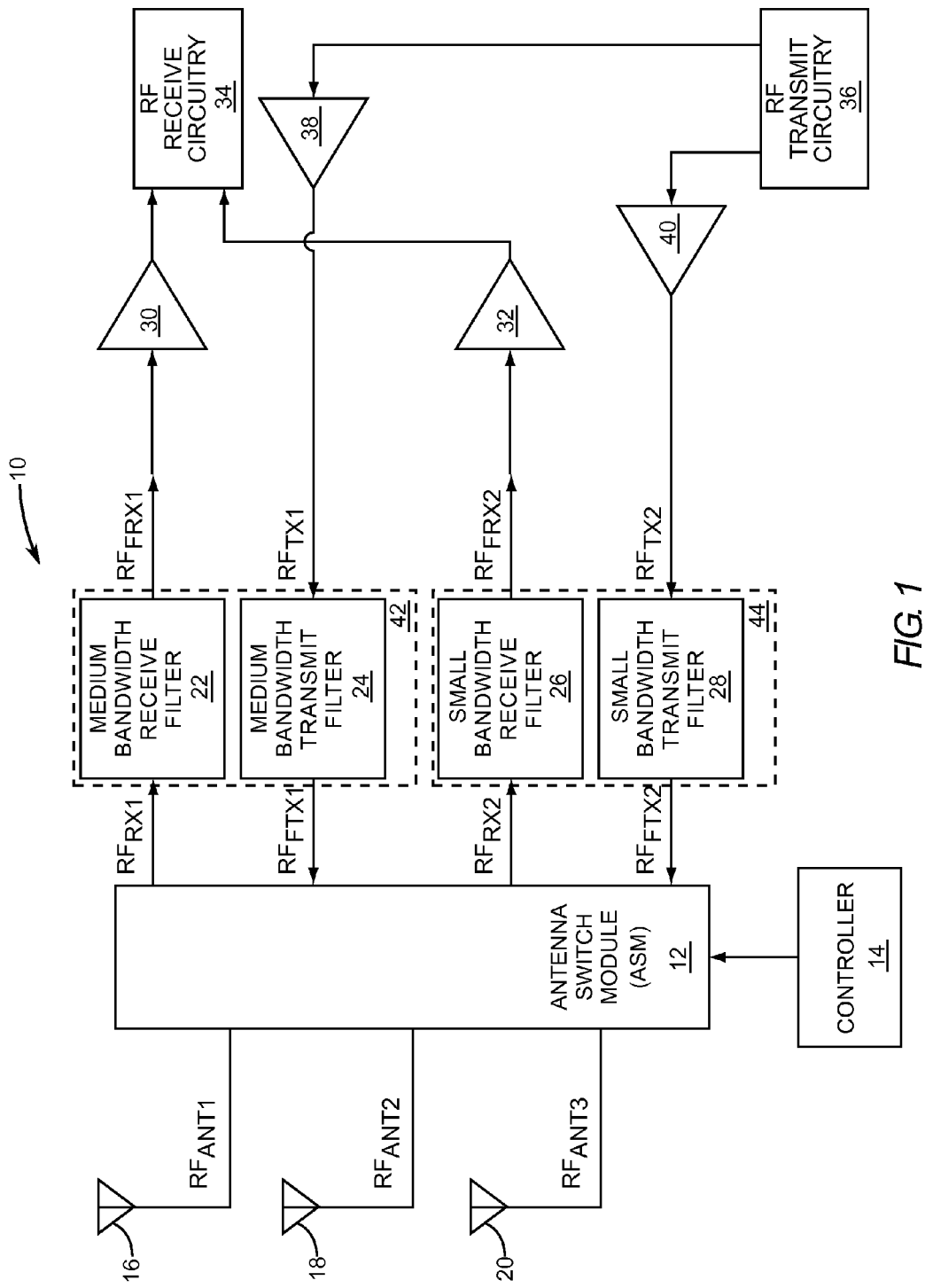
FIG. 1 is a schematic depicting a front end radio architecture that in accordance with the present disclosure is configured to provide a split band frequency arrangement that includes co-banding.

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

A front end radio architecture is configured to provide a split band frequency arrangement that includes co-banding. The disclosed split band frequency arrangement combines a medium bandwidth filter with a small bandwidth filter to provide enough bandwidth to pass a relatively large communication band that covers around about 194 MHz of bandwidth. The medium bandwidth filter has a bandwidth that is large enough to support co-banding of smaller communication bands, while also having a narrow enough bandwidth to realize a relatively steep roll-off that ensures coexistence with adjacent bands that are not co-banded. In particular, the medium bandwidth filter has a passband that ranges from around about 144 MHz to around about 145 MHz, while the small bandwidth filter has a passband that ranges from around about 70 MHz to around about 74 MHz. The bandwidths of the medium bandwidth filter and the small bandwidth filter overlap in bandwidth by an amount that is at least as large as the highest bandwidth signal expected to be received or transmitted. The split band frequency arrangement reduces the number of filters needed in the front end radio architecture by repurposing the small bandwidth filter, and by co-banding the smaller communication bands. As will be recognized by those skilled in the art, the medium bandwidth filter and the small bandwidth filter can be constructed using series and shunt resonators. The component values and circuit topologies employed to construct these filters are selected to realize desired filter responses.

One embodiment of the front end radio architecture splits a relatively large bandwidth of a receive band into a lower receive sub-band and an upper receive sub-band. A medium bandwidth receive filter is configured to receive signals within the lower receive sub-band. Co-banded signals within the lower receive sub-band are also receivable through the medium bandwidth receive filter. A receive diversity filter is repurposed via switches to receive signals within the upper receive sub-band. As a result of reusing the receive diversity filter, the total filter count needed by the front end architecture is reduced by at least one filter. The total filter count is also reduced by one filter for each small band that is included within the bandwidth of the medium bandwidth receive filter, since a separate filter would typically be needed for each of the relatively small bands filtered in a front end radio architecture that does not implement co-banding.

Another embodiment of the front end radio architecture splits a relatively large bandwidth of a transmit band into a lower transmit sub-band and an upper transmit sub-band. A medium bandwidth transmit filter is configured to pass transmit signals within the upper transmit sub-band. Co-banded signals within the upper transmit sub-band are also transmittable through the medium bandwidth transmit filter. A small bandwidth transmit filter is repurposed via switches to pass transmit signals within the lower transmit sub-band. As a result of reusing the small bandwidth transmit filter, the total filter count needed by the front end radio architecture is reduced by at least one filter. The total filter count is also reduced by one filter for each of the relatively small bands included within the bandwidth of the medium bandwidth transmit filter, since a separate filter would be typically be needed for each of the relatively small bands filtered in a front end architecture that does not implement co-banding.

FIG. 1 is a schematic depicting a front end radio architecture 10 that in accordance with the present disclosure is configured to provide a split band frequency arrangement that includes co-banding. The front end radio architecture 10 includes an antenna switch module (ASM) 12 that is responsive to a controller 14, which is configured to selectively couple a first RF antenna 16, a second RF antenna 18, and a third RF antenna 20 to a medium bandwidth receive filter 22, a medium bandwidth transmit filter 24, a small bandwidth receive filter 26, and a small bandwidth transmit filter 28.

A first low noise amplifier (LNA) 30 and a second LNA 32 amplify signals that are passed by the medium bandwidth receive filter 22 and the small bandwidth receive filter 26, respectively. RF receive circuitry 34 receives amplified signals from the first LNA 30 and the second LNA 32, respectively. RF transmit circuitry 36 outputs signals to be transmitted to a first power amplifier 38 and a second power amplifier 40. A first amplified signal output from the first power amplifier 38 is passed by the medium bandwidth transmit filter 24 to a selected one of the first RF antenna 16, the second RF antenna 18, or the third RF antenna 20. A second amplified signal output from the second power amplifier 40 is passed by the small bandwidth transmit filter 28 to a selected one of the first RF antenna 16, the second RF antenna 18, and the third RF antenna 20.

The medium bandwidth receive filter 22 and the medium bandwidth transmit filter 24 can be fabricated into a special duplexer 42. Similarly, the small bandwidth receive filter 26 and the small bandwidth transmit filter 28 can be fabricated into a standard duplexer 44. However, it is to be understood that other combinations of the medium bandwidth receive filter 22, the medium bandwidth transmit filter 24, the small bandwidth receive filter 26, and the small bandwidth transmit filter 28 can be fabricated into hybrid duplexers. For example, the medium bandwidth receive filter 22 could be fabricated together with the small bandwidth transmit filter 28 to realize a hybrid duplexer. Similarly, the medium bandwidth transmit filter 24 could be combined with the small bandwidth receive filter 26 to realize yet another hybrid duplexer. Further still, it is to be understood that the front end radio architecture 10 will typically include combinations of standalone medium bandwidth filters and small bandwidth filters as well as duplexer versions of the small bandwidth filters and medium bandwidth filters.

Figure 2:
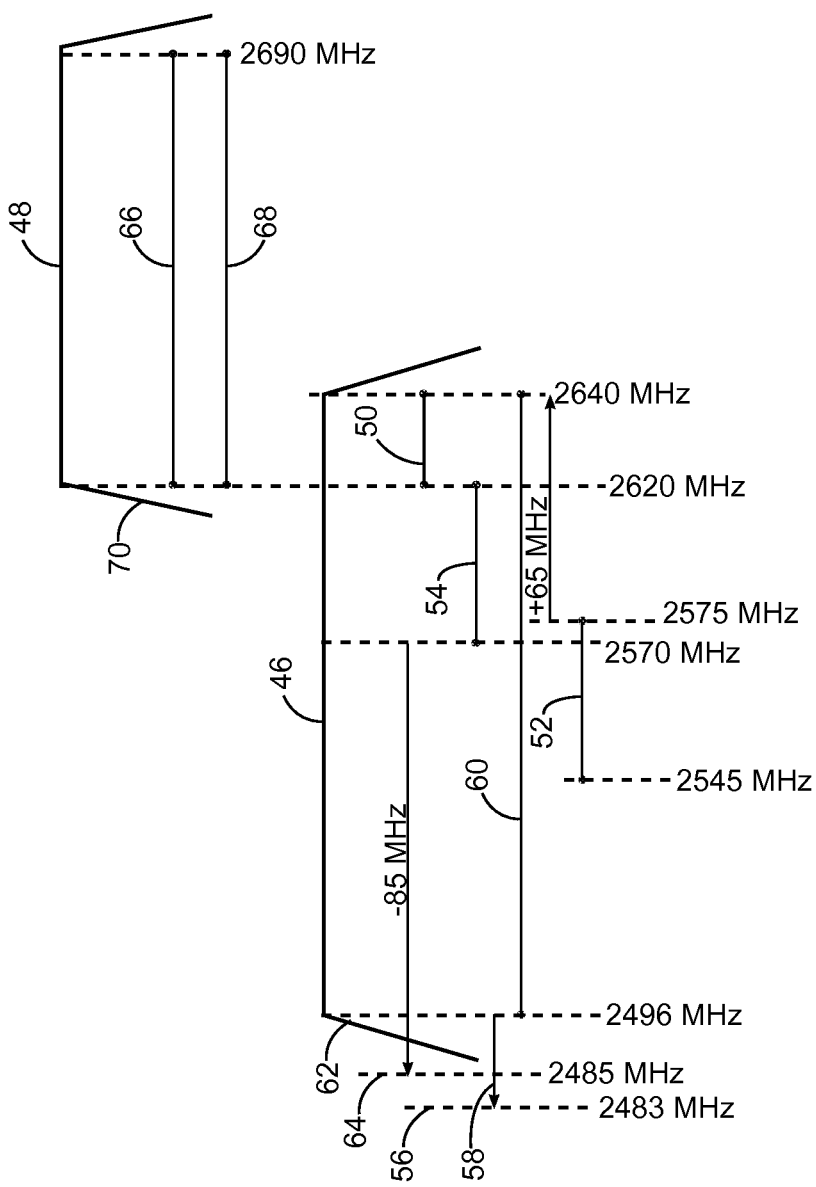
FIG. 2 is a graph depicting receive filter responses for a split band frequency arrangement that includes co-banding.

FIG. 2 is a graph depicting receive filter responses for a split band frequency arrangement that includes co-banding. In particular, the graph depicts an exemplary co-banding and split band receive frequency arrangement for Long-Term Evolution Time Division Duplex (LTE TDD). The split band arrangement shown in FIG. 2 includes a first ideal receive filter response split 46 and a second ideal receive filter response split 48. A receive bandwidth overlap 50 is shared between the first ideal receive filter response split 46 and the second ideal receive filter response split 48. A first receive co-band 52 and a second receive co-band 54 are located within the first ideal receive filter response split 46.

An industrial, scientific and medical (ISM) band upper boundary 56 is protected by a guard band 58 that separates the ISM band upper boundary 56 from the medium receive passband 60. A relatively steep roll-off 62 of around about 40 dB to around about 50 dB is needed to ensure coexistence with an ISM band associated with the ISM band upper boundary 56. A lower frequency boundary of a −15 dBm blocker level 64 is located within the guard band 58, while falling outside of the relatively steep roll-off 62.

The second ideal receive filter response split 48 includes a small receive passband 66 that can be equal to or larger than a third receive co-band 68. In the exemplary case of FIG. 2, the third receive co-band 68 is equivalent to the bandwidth of the LTE Frequency Division Duplex (FDD) band B7. A relatively steep roll-off 70 of around about 40 dB to around about 50 dB is desirable for the second ideal receive frequency response split 48. Moreover, in the example of FIG. 2, since the small bandwidth receive filter 26 is a band B7 filter, it is reusable to pass signals of an upper sub-band split that ranges from 2620 MHz to 2690 MHz during diversity/receive multiple input multiple output (MIMO) operation for LTE TDD band B41.

Further still, the medium bandwidth receive filter 22 is added to pass a lower receive sub-band split that ranges from 2496 MHz to 2640 MHz. The medium bandwidth receive filter 22 includes the receive bandwidth overlap 50 of an extra 20 MHz to allow co-banding of the receive band B41 XGP and the receive band B38. The medium bandwidth receive filter 22 also provides filtering against out-of-band blockers. A third generation partnership project (3GPP) specification TS36101 requires that out-of-band blockers be suppressed −15 dBm at a frequency 85 MHz below a band of operation. For example, the lowest frequency of the LTE TDD band B38 is 2570 MHz, so the blocker level to which the amplitude is specified to −15 dBm starts at 2485 MHz outside of the medium bandwidth receive filter 22 by an 11 MHz offset. As a result, the medium bandwidth receive filter 22 can be made relatively slightly tunable if necessary to shift up or down by a few MHz. Also, the medium bandwidth receive filter 22 provides the 13 MHz guard band 58, which protects against desensitization of the RF receive circuitry 34 (FIG. 1) by blocker signals coming from the ISM band. About 40 dB of filtering is needed to reduce a +10 dBm ISM band blocker level to a −30 dBm blocker level.

Figure 3:
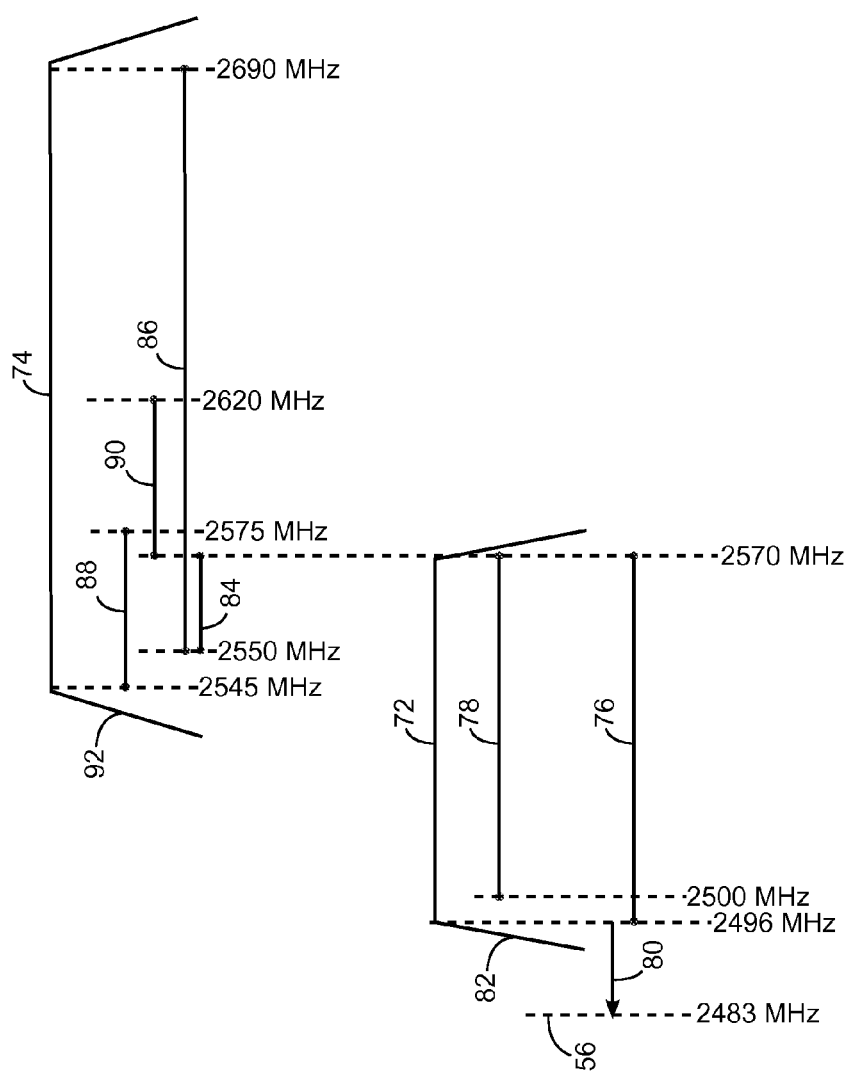
FIG. 3 is a graph depicting transmit filter responses for a split band frequency arrangement that includes co-banding.

FIG. 3 is a graph depicting transmit filter responses for a split band frequency arrangement that includes co-banding. In particular, the graph depicts an exemplary co-banding and split band transmit frequency arrangement for LTE TDD. The split band arrangement shown in FIG. 3 includes a first ideal transmit filter response split 72 and a second ideal transmit filter response split 74.

The first ideal transmit filter response split 72 includes a small transmit passband 76 that accommodates a first transmit co-band 78. The ISM band upper boundary 56 is protected by a guard band 80 that separates the ISM band upper boundary 56 from the small transmit passband 76. A relatively steep roll-off 82 of around about 40 dB to around about 50 dB is needed to ensure coexistence with the ISM band associated with the ISM band upper boundary 56.

A transmit bandwidth overlap 84 is shared between the first ideal transmit filter response split 72 and the second ideal transmit filter response split 74. A medium transmit passband 86 is located within the second ideal transmit filter response split 74. A second transmit co-band 88 and a third transmit co-band 90 are located within the second ideal transmit filter response split 74. However, the second transmit co-band 88 has a lower boundary that extends outside of the medium transmit passband 86. A relatively steep roll-off 92 of around about 40 dB to around about 50 dB is desirable for the second ideal transmit filter response split 74.

In an exemplary embodiment, the first ideal transmit filter response split 72 is implemented in part by using the standard duplexer 44 (FIG. 1) as an LTE FDD band B7 duplexer in which the small bandwidth transmit filter 28 (FIG. 1) has a bandwidth that is relatively slightly extended by around about 4 MHz. The slight bandwidth extension does not affect receive band noise filtering because the receive frequency is a significantly higher frequency. The exemplary transmit embodiment also adds the medium bandwidth transmit filter 24 (FIG. 1) to pass transmit band B41 XGP and transmit band B38. Note that the transmit filter is extended on a lower frequency side by around about 20 MHz to make up the transmit bandwidth overlap 84. It is preferred to have transmit B41 XGP co-banding within the medium bandwidth transmit filter 24 rather than within the standard duplexer 44 (FIG. 1) to avoid extending the small bandwidth transmit filter 28 by 5 MHz. Such a bandwidth extension could negatively impact receive band noise since a guard band between the small bandwidth receive filter 26 and the small bandwidth transmit filter 28 would be reduced. A result of this exemplary embodiment is the elimination of the necessity of at least one transmit filter and two switch throws from a standard front end radio architecture (not shown).

Those skilled in the art will recognize improvements and modifications to the preferred embodiments of the present disclosure. All such improvements and modifications are considered within the scope of the concepts disclosed herein and the claims that follow.

What is claimed is:

1. A front end radio architecture comprising:
   a medium bandwidth filter; and
   a small bandwidth filter having a bandwidth overlap with the medium bandwidth filter such that signals of a large communication band are passable through a combined bandwidth of the medium bandwidth filter and the small bandwidth filter, wherein the medium bandwidth filter has a bandwidth sufficient to support a co-banding of at least two smaller communication bands, yet having a bandwidth roll-off that ensures coexistence with adjacent communication bands that are not co-banded.

2. The front end radio architecture of claim 1 wherein the small bandwidth filter is configured to pass signals of one radio technology, and wherein a combination of the small bandwidth filter and the medium bandwidth filter is configured to pass signals of another radio technology.

3. The front end radio architecture of claim 2 wherein the one radio technology is Long-Term Evolution Time Division Duplex (LTE TDD) and the another radio technology is LTE Frequency Division Duplex (FDD).

4. The front end radio architecture of claim 1 wherein the medium bandwidth filter has a medium receive passband that extends from around about 2496 MHz to around about 2640 MHz.

5. The front end radio architecture of claim 4 where a guard band of 13 MHz is realized between the medium receive passband and an upper boundary of an adjacent communication band.

6. The front end radio architecture of claim 4 wherein the steep roll-off is around about 40 dB to around about 50 dB.

7. The front end radio architecture of claim 1 wherein the at least two smaller communication bands are a first receive co-band that extends from around about 2545 MHz to around about 2575 MHz and a second receive co-band that extends from around about 2570 MHz to around about 2620 MHz.

8. The front end radio architecture of claim 7 wherein a −15 dBm blocker level is located around about 85 MHz below 2570 MHz.

9. The front end radio architecture of claim 7 wherein a −15 dBm blocker level is located around about 65 MHz above 2575 MHz.

10. The front end radio architecture of claim 1 wherein the small bandwidth filter has a small receive passband that extends from around about 2620 MHz to 2690 MHz.

11. The front end radio architecture of claim 10 wherein the small bandwidth filter has a steep roll-off of around about 40 dB to around about 50 dB.

12. The front end radio architecture of claim 1 wherein the bandwidth overlap is around about 20 MHz.

13. The front end radio architecture of claim 1 wherein the small bandwidth filter has a small transmit passband that extends from around about 2496 MHz to 2570 MHz.

14. The front end radio architecture of claim 13 wherein the small bandwidth filter has a steep roll-off of around about 40 dB to around about 50 dB.

15. The front end radio architecture of claim 1 wherein the small bandwidth filter includes a first transmit co-band that extends from around about 2500 MHz to around about 2570 MHz.

16. The front end radio architecture of claim 1 wherein the medium bandwidth filter has a medium transmit passband that extends from around about 2550 MHz to around about 2690 MHz.

17. The front end radio architecture of claim 16 wherein the medium bandwidth filter has a steep roll-off of around about 40 dB to around about 50 dB.

18. The front end radio architecture of claim 1 wherein the at least two smaller communication bands are a second transmit co-band that extends from around about 2545 MHz to around about 2575 MHz and a third transmit co-band that extends from around about 2570 MHz to around about 2620 MHz.

19. The front end radio architecture of claim 1 further including an antenna switch module (ASM) that is controllable to selectively couple antennas to the medium bandwidth filter and the small bandwidth filter in various combinations.

20. The front end radio architecture of claim 19 further including a controller to control the ASM to selectively couple antennas to the medium bandwidth filter and the small bandwidth filter in various combinations.

* * * * *